United States Patent [19]

Suei-Long

[11] Patent Number: 5,154,449
[45] Date of Patent: Oct. 13, 1992

[54] EXTENSIBLE ROD

[76] Inventor: Peter L. Suei-Long, No. 21-1, Tung Chih Lane, Kang wei Li, Taichung City, Taiwan

[21] Appl. No.: 661,134

[22] Filed: Feb. 27, 1991

[51] Int. Cl.⁵ .............................. F16B 7/10
[52] U.S. Cl. ............................ 285/298; 248/413; 403/109; 285/312
[58] Field of Search ................... 285/298, 311, 312; 403/104, 109, 110; 248/337, 333, 411, 412, 413, 421

[56] References Cited

U.S. PATENT DOCUMENTS

| | | | |
|---|---|---|---|
| 428,359 | 5/1890 | Warren | 285/298 |
| 1,261,687 | 4/1918 | Brandon | 285/312 |
| 1,519,095 | 12/1924 | Kraft | 285/312 |
| 1,733,072 | 10/1929 | Pierce | 285/298 |
| 1,845,143 | 2/1932 | Friesner | 403/109 |
| 2,531,525 | 11/1950 | Oakes | 285/312 |
| 2,806,722 | 9/1957 | Atkins | 403/109 |
| 3,155,402 | 11/1964 | Cornelius | 285/312 |
| 3,203,657 | 8/1965 | Thompson | 403/104 |
| 3,734,441 | 5/1973 | Lux | 403/104 |
| 4,360,283 | 11/1982 | Psotta | 403/104 |
| 4,430,017 | 2/1984 | Stefancicn | 403/109 |
| 4,576,501 | 3/1986 | McConnell | 403/109 |
| 4,761,092 | 8/1988 | Nakatami | 403/109 |

FOREIGN PATENT DOCUMENTS

| | | | |
|---|---|---|---|
| 643472 | 4/1937 | Fed. Rep. of Germany | 285/312 |
| 1451080 | 8/1966 | France | 285/312 |
| 391387 | 9/1965 | Switzerland | 285/312 |
| 20404 | of 1900 | United Kingdom | 403/109 |
| 169257 | 9/1921 | United Kingdom | 285/312 |
| 1460948 | 1/1977 | United Kingdom | 403/109 |

Primary Examiner—Eric K. Nicholson
Attorney, Agent, or Firm—Bacon & Thomas

[57] ABSTRACT

An extensible rod comprising an outer tube, an inner tube fitting in the outer tube and a locking unit consisting of a cylindrical clamp, a movable block, and an eccentric shield. The outer tube and the inner tube are clamped in the locking unit by pivoting the eccentric shield causing the shield to pinch the clamp to secure the outer tube and to press the movable block against.

5 Claims, 4 Drawing Sheets

EXTENSIBLE ROD

BACKGROUND OF THE INVENTION

A conventional extensible rod widely applied in cleaning or agricultural tools, as shown in FIGS. 1,2, comprises an outer tube 1 and an inner tube 2 to be fitted in the outer tube 1, a tubal base 3 having an eccentric shaft 31 fitting and possible to rotate in an eccentric ring 4, a positioner 5 at the upper end of the outer tube 1, and a screw cap 6 to screw with the positioner 5.

The locking movement of the conventional extensible rod is effected by turning the eccentric ring 4 to be tightened against the eccentric shaft 31 and screwing the screw cap 6 tightly against the positioner 5.

The structure of the conventional rod has the following disadvantages.

1. The tightened relation between the eccentric shaft and the eccentric ring and the tightened relation between the eccentric ring and the inner surface of the outer tube are liable to slide off each other.

2. The locking structure of the extensible rod is rather complicated, and besides, locking or unlocking operation requires two stages, looking like double guarantees but practically not sophisticated enough.

SUMMARY OF THE INVENTION

In view of the disadvantages of the conventional extensible rod, this invention has been devised to supply an extensible rod of simple structure for easy operation.

The extensible rod in the present invention comprises an outer tube, an inner tube fitting in the outer tube and a locking unit. The outer and the inner tube have no special features, and the inner tube can be movably fitted in the outer tube.

The locking unit consists of a cylindrical clamp, a movable block, and an eccentric shield.

The cylindrical clamp for clamping the outer and the inner tube has an upper section for the inner tube to fit therein and an lower section for the upper end of the outer tube to fit therein and a half-through gap set between both sections. The lower section has a slit in a sidewise rectangular projecting part to function as an elasticity to clamp the outer tube when the eccentric shield is closed down on the clamp.

The upper section of the clamp has an opening at a proper place for a stop rod to fit in and a pair of sidewise projecting ears with a pine hole for a pin to pass through to pivotally combine the clamp with the eccentric shield, which has an eccentric shaft at the front end bored with a shaft hole which the pin also pass through.

The movable block has a curved face on the inner side to fit with the outer surface of the inner tube and a curved face on the outer side to fit around the lower edge of the eccentric shaft of the eccentric shield. A groove is provided in the curved face on the inner side for a stop rod to fit in for preventing the movable block from separating from the clamp and the curved face is possible to press and keep the inner tube from moving.

The eccentric shield is nearly U-shaped and has at the front end an eccentric shaft bored with a shaft hole for the pin passing through the pin holes in the clamp to pass through so that the eccentric shield can be moved rotatingly with the pin as a pivot to press or release the movable block and the rectangular projecting part in the lower section of the clamp in locking or unlocking the inner tube and the outer tube and thus locking this extensible rod at an adjusted length by extending or shortening the inner tube in the outer tube in advance.

DETAILED DESCRIPTION OF THE INVENTION

Figure 1:
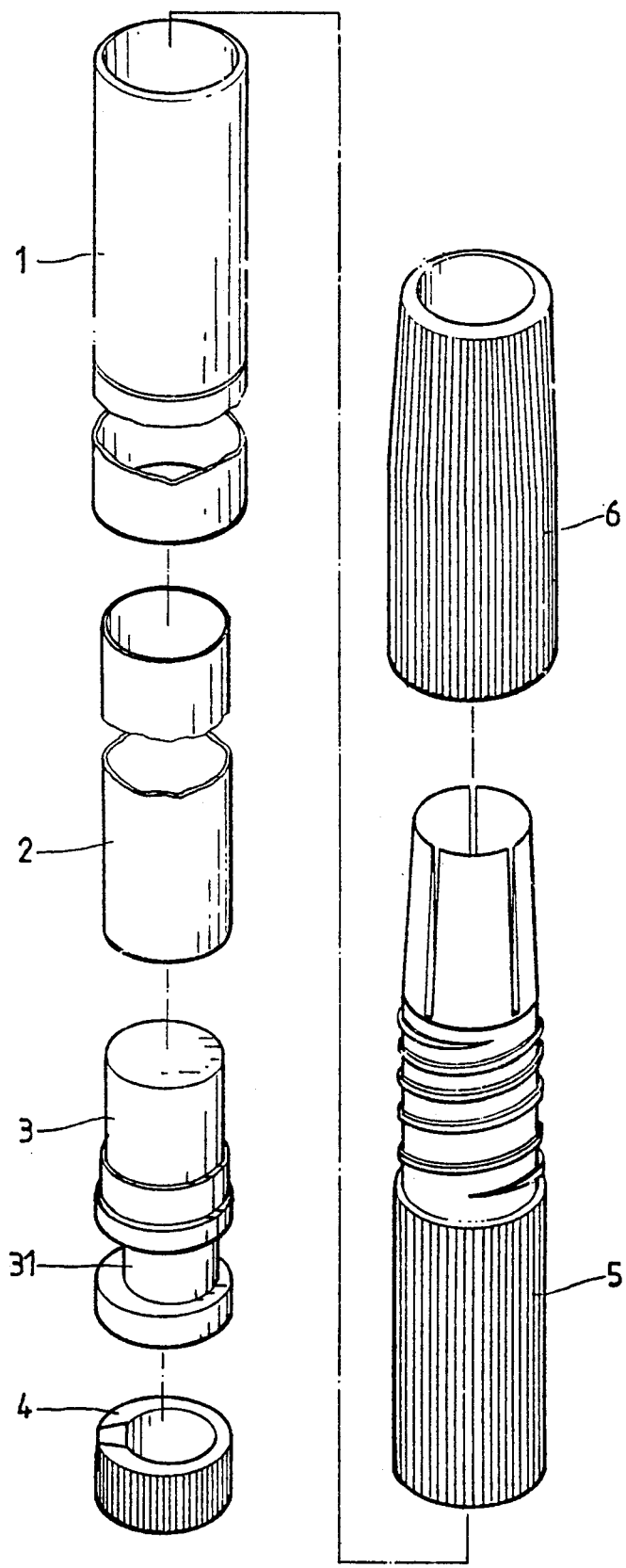
FIG. 1 is a cross-sectional view of a conventional extensible rod.
Figure 2:
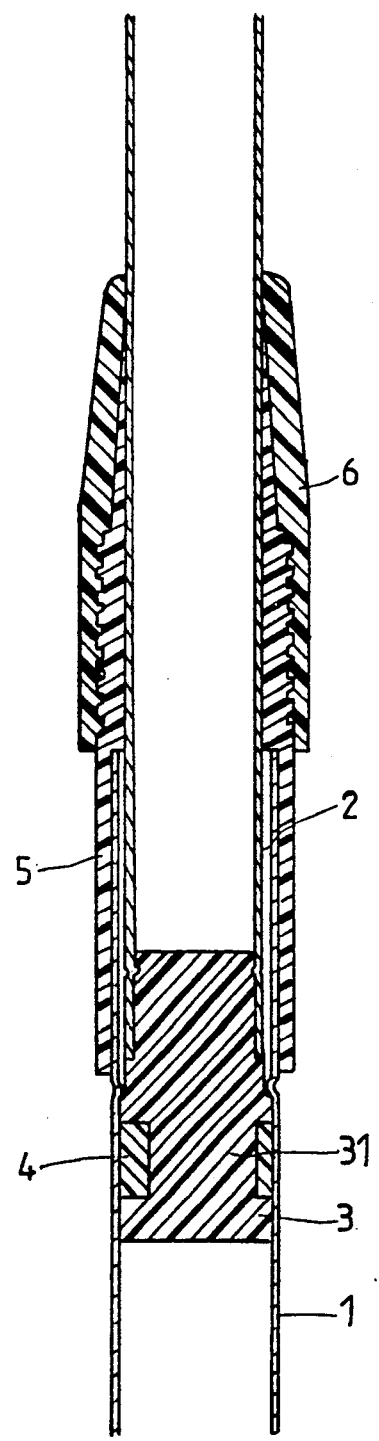
FIG. 2 is an exploded perspective view of a conventional extensible rod.
Figure 3:
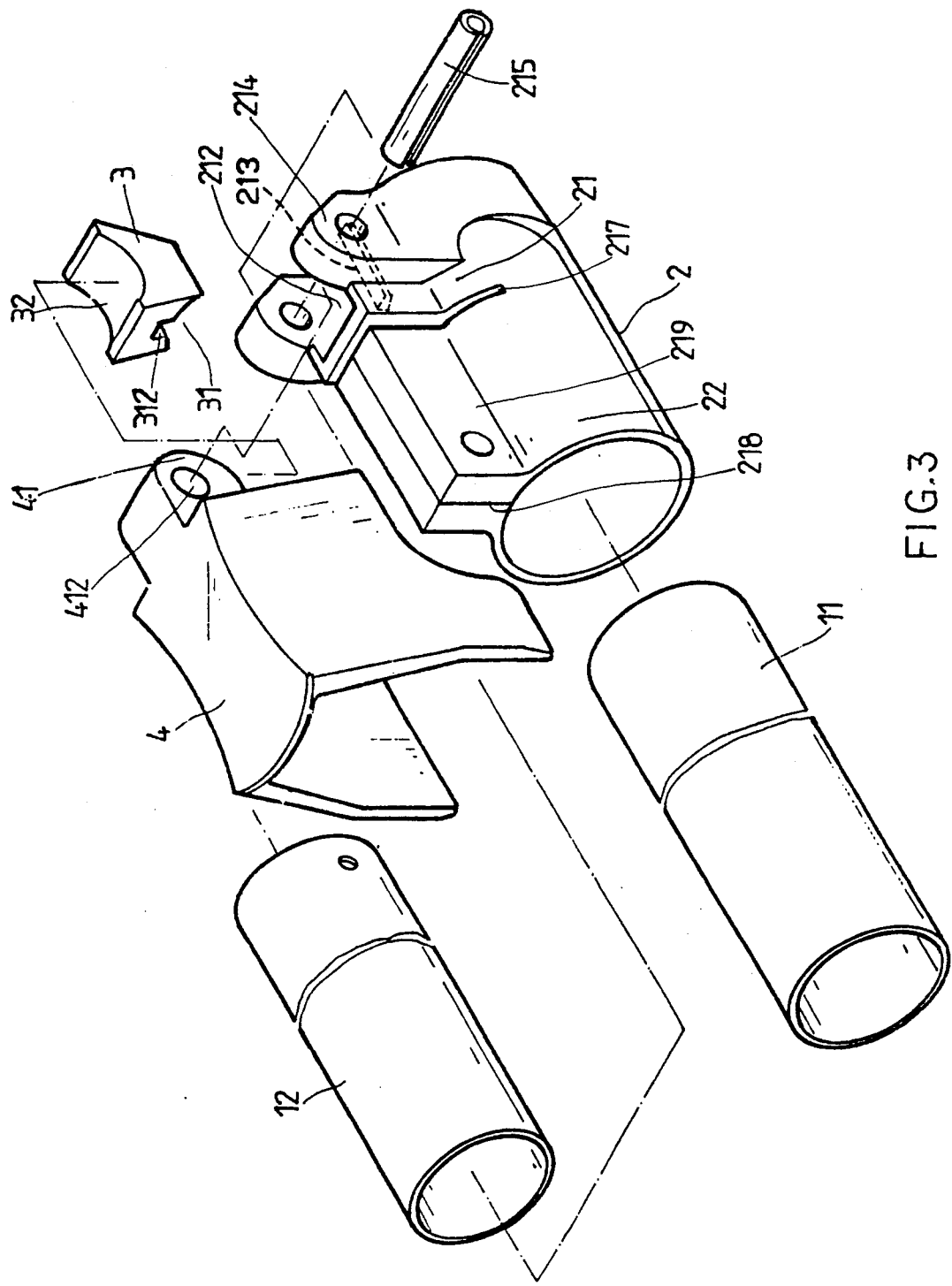
FIG. 3 is an exploded perspective view of the extensible rod in the present invention.

As shown in FIG. 3, the extensible rod in the present invention comprises an outer tube 11, an inner tube 12 and a locking unit as the main components.

The outer tube 11 and the inner tube 12 to be fitted in the outer tube 11 have no special structure, omitted in their description.

The locking unit comprises a cylindrical clamp 2, a movable block 3 and an eccentric shield 4. The clamp 2 is shaped cylindrical and has an upper section 21 and a lower section 22, and the upper section 21 has a cylindrical hollow of the same diameter as that of the inner tube 12 and the lower section 22 has a cylindrical hollow of the same diameter as that of the outer tube 11 such that the upper end of the outer tube 11 may be positioned in the bottom part of the lower section 22 and the inner tube 12 may be positioned in the upper section 21. A pair of ears 214 having through pins holes project sidewise at the upper section 21 for a pin 215 to pass through so that the eccentric shield 4 may be movably assembled to the clamp 2 in area 212 by means of the pin 215 also passing through a pin hole 412 in the shield 4.

A lateral half-through gap 217 is provided between the upper section 21 and the lower section 22 in the clamp 2. The lower section 22 of the clamp 2 has an elasticity coming from a split 218 in a sidewise rectangular projecting part 219 so that the outer tube 11 can be clamped firmly around its inner surface by means of its elasticity.

The movable block 3 has a curved face 31 at the inner side to fit around the outer surface of the inner tube 12 and a curved face 32 at the outer side to fit around an eccentric shaft 41 of the eccentric shield 4. A groove 312 is provided in the curved face 31 for a stop rod 213 to fit in so that the movable block 3 may not separate from the clamp 2 and the curved face 31 may press and keep the inner tube 12 from moving after the locking unit is locked.

The eccentric shield 4 is U-shaped like surrounding the lower section 22 when it is moved to position on the clamp 2 so as to reinforce clamping the lower section 22 by pinching the rectangular projecting part of the lower section, and having an eccentric shaft 41 at the front end bored with a shaft hole 412 for the pin 215 to fit in pivotably for controlling the movable block 3 in its movement.

Figure 5:
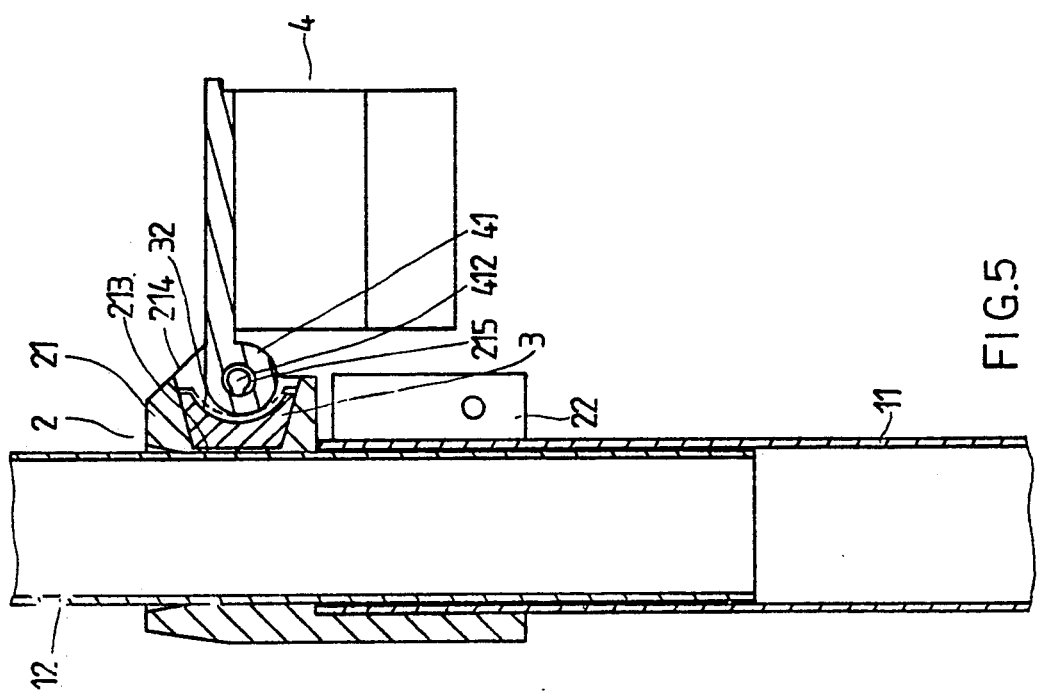
FIG. 5 is a cross-sectional view of the extensible rod unlocked in the present invention.

When the eccentric shield 4 is pulled up rotatingly with the pin 215 as a pivot, the eccentric shaft 421 can have its thin part in touch with the curved face 32, releasing the movable block 3 back a little, as shown in FIG. 5, so that the inner tube 12 can be moved in relation to the outer tube 11 and adjusted in its position to acquire a proper length of this rod.

Figure 4:
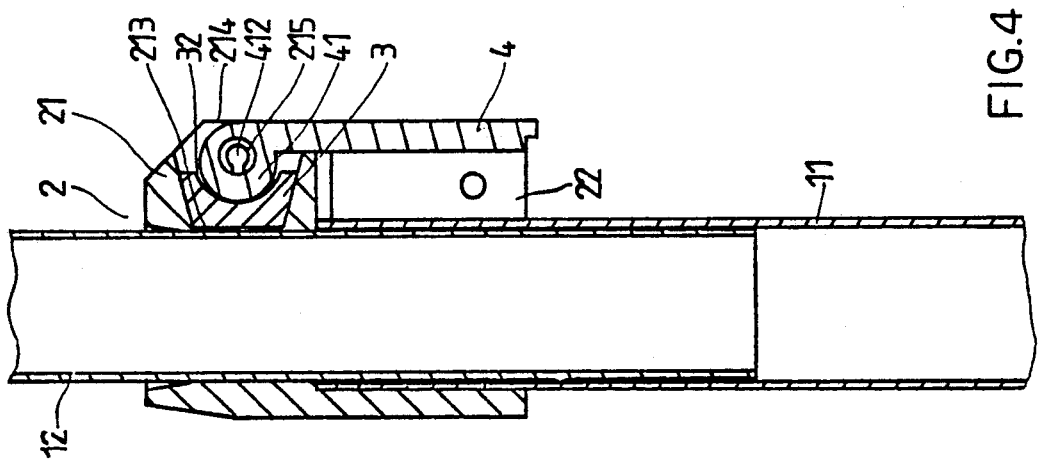
FIG. 4 is a cross-sectional view of the extensible rod locked in the present invention.

When the eccentric shield 4 is closed down rotatingly on the clamp 2, the eccentric shaft 41 has its thick part in touch with the curved face 32 of the movable block 3 so that the movable block 3 is forced to extend in the clamp 2 locking the inner tube 12 immovable, as shown in FIG. 4.

What is claimed is:

1. An extensible rod comprising:
   a first tube;
   a second tube having a diameter greater than said first tube such that said first tube may be slidably received within said second tube;
   a locking unit adapted to receive and secure said first and second tubes, said locking unit including:
     a clamping having a longitudinal axis defined by an upper section and a lower section of said clamp which are separated by a lateral gap extending through a predetermined portion of said clamp, said lower section including a hollow portion which is split in the longitudinal direction along its length and is adapted to receive at least said second tube therein, said upper section also including a hollow portion to receive said first tube, said upper section further including means defining a pivot axis and a transverse bore that opens into its hollow portion;
     a shield member including an eccentric shaft pivotally secured to said upper section through said means defining a pivot axis, said shield being adapted to pivot about said pivot axis and clamp about said split lower section of said locking unit to secure said second tube therein; and
     a movable block slidably mounted within the transverse bore of said upper section, said movable block including a first face adapted to extend into the hollow portion of said upper section and engage said first tube to secure said first tube within said upper section and a second, opposing face adapted to be engaged by the eccentric shaft of said shield to cause movement of said block toward said first tube upon pivoting of said shield into clamping engagement with said lower section, whereby when said first and second tubes are positioned within said locking unit and said shield is pivoted, said movable block will secure said first tube within said locking unit and said shield will cause said split lower section to clamp said second tube within said locking unit.

2. The extensible rod of claim 1, further including a stop rod extending across aid transverse bore to maintain said block within said transverse bore when said first tube is located outside said upper section.

3. The extensible rod of claim 1 wherein said means defining a pivot axis includes a pair of spaced, upstanding ear members between which said eccentric shaft is mounted and a pivot pin extending through said ear members and said eccentric shaft.

4. The extensible rod of claim 1, wherein said shield member is substantially U-shaped and extends about a predetermined portion of said upper section.

5. The extensible rod of claim 1, wherein said first and second tubes and the hollow portions of said upper and lower sections of said clamp are cylindrical in shape.

* * * * *